United States Patent [19]

Hodge

[11] 4,201,443

[45] May 6, 1980

[54] OPTICAL FIBER COUPLER FOR INTERFACING WITH LIGHT SOURCES AND DETECTORS

[75] Inventor: Malcolm H. Hodge, Claymont, Del.

[73] Assignee: TRW Inc., Elk Grove Village, Ill.

[21] Appl. No.: 854,925

[22] Filed: Nov. 25, 1977

[51] Int. Cl.² .............................................. G02B 5/14
[52] U.S. Cl. .............................. 350/96.20; 250/227; 250/552
[58] Field of Search ............... 350/96.20, 96.21, 96.22; 250/227, 239, 552; 29/629

[56] References Cited

U.S. PATENT DOCUMENTS

| | | | |
|---|---|---|---|
| 3,628,036 | 12/1971 | Humphrey | 350/96.21 |
| 3,936,143 | 2/1976 | Sato | 350/96.21 |
| 3,948,582 | 4/1976 | Martin | 350/96.21 |
| 3,950,075 | 4/1976 | Cook et al. | 350/96.22 |
| 4,047,796 | 9/1977 | Kao et al. | 350/96.21 |
| 4,087,155 | 5/1978 | Deacon | 350/96.21 |
| 4,093,341 | 6/1978 | Crick | 350/96.21 |
| 4,101,197 | 7/1978 | Kent et al. | 350/96.20 |

Primary Examiner—Stewart J. Levy
Attorney, Agent, or Firm—Neuman, Williams, Anderson & Olson

[57] ABSTRACT

An optical fiber coupler for interfacing with a light active element and means for assembling and connecting said coupler to said element. The coupler comprises a guide assembly having at least three glass rods disposed in a side-by-side array, parallel to one another and with longitudinal peripheral portions of adjacent rods in contact and connected to each other to form a cusp-shaped interstitial channel therebetween. The assembly includes a first and second flat end. The channel at the second end is flared to facilitate the ingress of an optical fiber in said channel. A segment of optical fiber having a first and second flat end is disposed and fused within the channel with its second end located at an intermediate portion along the channel with its first end being co-planar with the first end of the guide assembly. The light active element, such as a light emitting diode, is secured to the first end of the optic fiber section and the co-planar end of the guide assembly to form a good light transmissive interface.

9 Claims, 8 Drawing Figures

OPTICAL FIBER COUPLER FOR INTERFACING WITH LIGHT SOURCES AND DETECTORS

This invention relates generally to fiber optic transmission systems and more particularly to optic fiber couplers for connection to light emitters or detectors in such systems.

Optical transmission systems are gaining wide acceptance in various fields, such as communications, control, etc. Such systems operate by the transmission of either ultraviolet, visible or infrared radiation, generically referred to hereinafter as light, between an emitter, e.g., a light emitting diode (LED), laser, etc., and a detector, e.g., photocell, light activated silicon controlled rectifier, etc. For the purposes of this invention both light emitters and detectors are referred to generically as light active elements since such elements actively produce or respond to light.

As is known, most light active elements include what can be called a working or active face at which light is produced, in the case of a light emitter, or at which light is received, in the case of a light detector. In order to facilitate the connection of the working face of the light active element to the optic fiber serving as the light transmission line of the system it is a common practice to secure a short length of an optic fiber to the working face of the element. The short length of the optic fiber is commonly referred to as a pigtail and serves as a coupler for connection to the optic fiber transmission line in the system. The connection of the light active element and its attached pigtail coupler into the optic fiber transmission system is normally accomplished by abutting the free end of the pigtail to the free end of the optic fiber serving as the transmission line. This is accomplished within a connector assembly. Various connector assemblies have been disclosed in patents and in other literature and some are commercially available. In my co-pending U.S. patent application Ser. No. 758,106, filed on Jan. 10, 1977, and assigned to the same assignee as the instant invention there is disclosed a connector and guide assembly particularly suited for effecting an in-line connection between a pair of optic fiber ends. Since the pigtail end is identical to the end of an optic fiber serving as a transmission line the connector of the invention in my aforenoted patent application is particularly suitable for connecting light active elements utilizing pigtail couplers into a fiber optic transmission system.

In U.S. Pat. No. 3,948,582 there is disclosed a rather complicated assembly incorporating a light active element therein for connection to the ends of an optic fiber transmission line. To that end, the assembly comprises a first and a second body. The first body is mounted in the rear part of the bore of a tubular casing. The other part of the casing includes either a light emitter or a light detector having a pigtail secured to the working face thereof and encapsulated in resin. The free end of the pigtail extends into an axial bore located in the forward portion of the first body. The bore terminates in a flared mouth. The second body of the assembly includes a tubular casing in which is centrally located the free end of the optic fiber to be connected to the light active element. The tubular casing of the second body is of greater diameter than the tubular casing of the first body to receive the first body therein such that the free end of the optic fiber held in the second body extends through the flared mouth in the first body for abutment with the free end of the pigtail to complete the optic connection.

While the prior art connectors, like the type described above, and particularly that of my co-pending patent application, are suitable for effecting the connection of the optic transmission fiber to a light active element having a pigtail coupler secured thereto, such connectors do not provide the means for facilitating the connection of the pigtail coupler to the light active element. Heretofore, the securement of the pigtail to the light active element has presented various difficulties and has not been accomplished readily. In this connection, as will be appreciated by those skilled in the art, the assembly of a light active element and a fiber optic pigtail has involved the delicate manipulative positioning of the pigtail onto the light emitting or receiving face of the element to establish its precise location therein. The location of the pigtail is determined by exciting the light active element while moving the pigtail across the working face of the element to determine the position of maximum light transference. Once the precise position of the pigtail is determined the pigtail is secured in place, such as by the use of epoxy.

While the precise positioning of a component of extremely small cross-sectional area, like a typical optic fiber, on an almost equally small working face of a light emitting element is difficult enough, it is accomplished further by the extreme flexibility of the unsupported free end of the optic fiber pigtail. Accordingly, precise alignment tools, such as micropositioners, are required.

In addition, since the pigtail is of such small cross-sectional area and such extreme flexibility difficulties are frequently encountered in preparing, e.g., cleaving, its end flat for establishing a good low loss connection to the light active element.

Accordingly, it is a general object of the instant invention to provide a coupler for interfacing with light active elements which overcomes the disadvantages of the prior art pigtail couplers.

It is a further object of the instant invention to provide an optic fiber coupler which can be readily constructed and facilitates its securement to a light active element.

It is still a further object of the instant invention to provide a fiber optic coupler for interfacing with a light active element and including means for connection to an optic fiber transmission line.

It is yet a further object of the instant invention to provide an optical coupler between an optic fiber and a light active element in a manner compatible with in-line fiber connections.

It is yet a further object of the instant invention to provide a method for connecting an optic fiber coupler to a light active element.

These and other objects of the instant invention are achieved by providing an optical fiber coupler for interfacing with a light active element. The coupler comprises a guide assembly having at least three glass rods disposed in a side-by-side array parallel to one another with longitudinal peripheral portions of adjacent rods in contact and connected to each other to form a cusp-shaped interstitial channel therebetween. The assembly is flat at a first end. An optic fiber having a first and second flat end is secured within the channel with its second end located at an intermediate portion along the channel and with its first end being co-planar with the flat first end of the guide assembly. The light active element is permanently secured to the assembly at the first end of the guide assembly and optic fiber to form a low loss light transmissive interface.

In accordance with another aspect of the invention a method is provided for securing the light active element to the coupler. The method comprises providing a guide assembly having at least three glass rods disposed in a side-by-side array parallel to one another with longitudinal peripheral portions of the adjacent rods in contact and connected to each other to form a cusp-shaped interstitial channel, inserting an optic fiber having a second foat end within the channel with the second end being located at an intermediate position therealong and securing the fiber within the channel. The guide assembly with the optic fiber secured therein is then cleaved at a predetermined point to create a generally planar end for said assembly and a co-planar end for said optic fiber. A light active element is then located on the planar end of said fiber and aligned with said optic fiber. The light active element is then secured in place thereat.

Other objects and many of the attendant advantages of the instant invention will be readily appreciated as the same becomes better understood with reference to the following detailed description when considered in connection with the accompanying drawing wherein.

Figure 1:
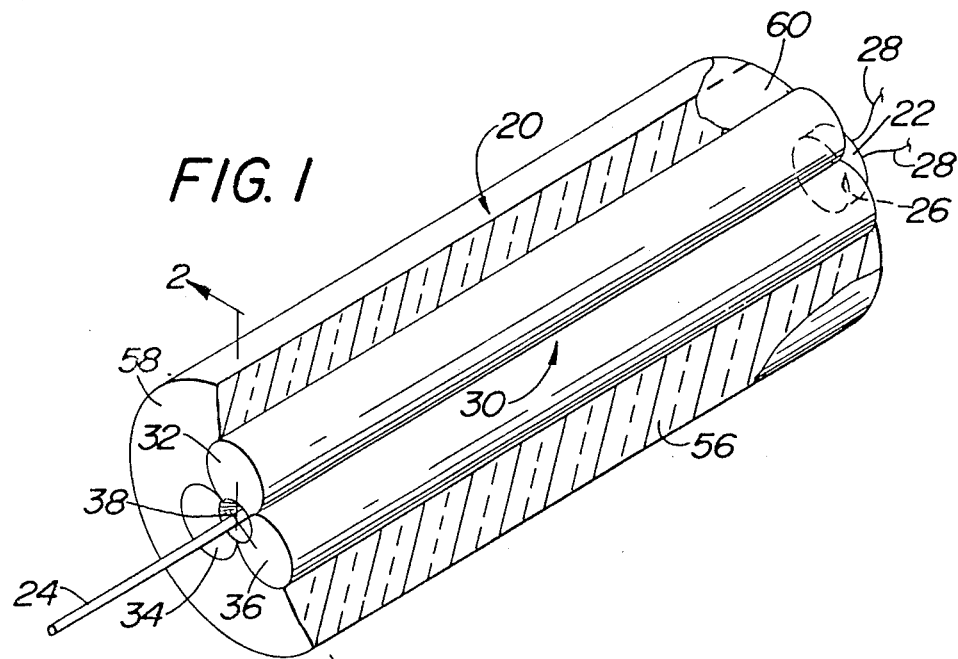
FIG. 1 is a perspective view, partially in section, of a coupler interfacing with a light active element in accordance with the instant invention.

Referring now in greater detail to the various figures of the drawing wherein like reference characters refer to like parts, an optic fiber coupler in accordance with the instant invention is shown at 20 in FIG. 1. The coupler 20 is arranged for mounting a light active element, such as a light emitting diode (LED) 22 thereon to enable the element to be connected to an optical fiber 24 of a fiber optic transmission system. It should be pointed out at this juncture that while the light active element 22 is shown and described as being a light emitting diode, it is clear that the coupler 20 of the instant invention is suitable for mounting and effecting the optical connection to any type of light active element as defined heretofore.

Figure 2:
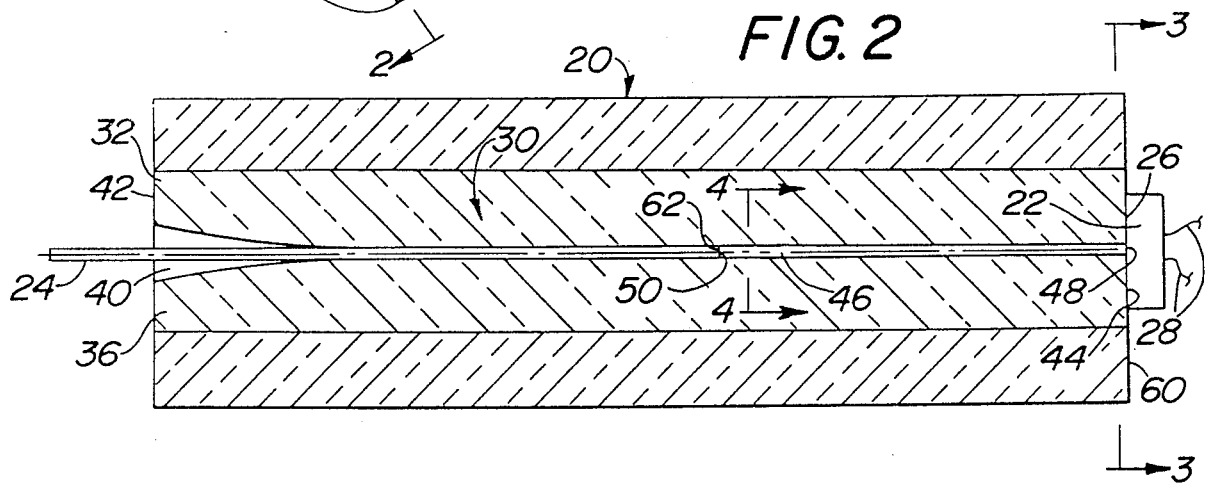
FIG. 2 is an enlarged sectional view taken along line 2—2 of FIG. 1.
Figure 3:
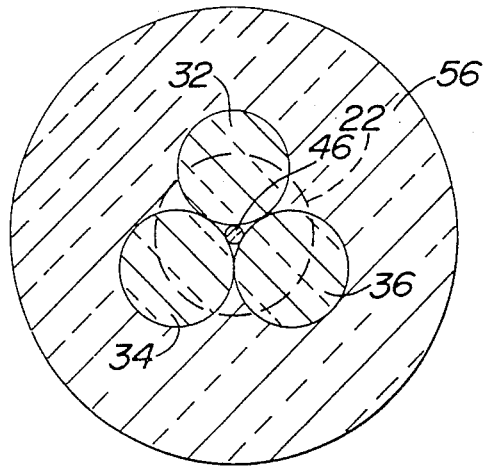
FIG. 3 is an enlarged sectional view taken along line 3—3 in FIG. 2.

As can be seen in FIGS. 1 and 2, the light emitting diode 22 is a conventional solid state device which is operative for producing and emitting light at its working face 26 when energized, via electrical conductors 28, from a source of electrical energy (not shown). As should be appreciated by those skilled in the art, the portion of the working face 26 of the light emitting diode at which the light is produced is of very small area, e.g., 0.05 mm. Accordingly, it is necessary to precisely align the optic fiber coupler with the light emitting portion of the working face to maximize the light transmitted into the coupler.

The coupler 20 of the instant invention facilitates that alignment process. The coupler 20 basically comprises a guide assembly 30 formed of three glass rods 32, 34 and 36 disposed in a side-by-side array parallel to one another and with longitudinal peripheral portions of adjacent rods in contact and connected to each other to form a cusp-shaped interstitial channel 38 (FIGS. 1 and 4) therebetween. As can be seen in FIG. 2, the cusp-shaped channel 38 includes a flared mouth 40 at one end 42 of the guide 30. The other end 44 of the guide 30 is planar. The formation of the planar surface 44 of guide 30 will be described in detail hereinafter with reference to the method of the instant invention.

A short length or section of a conventional optical fiber 46 is permanently secured within the channel 38 adjacent to the planar end 44 and terminates in a flat planar end 48 co-planar with the end 44 of the guide assembly 30. The other end 50 of the fiber optic section 46 is located within an intermediate portion of the channel 38. As will be described in detail later, the section 46 is preferably fused in place in the channel, although alternative securement means can be used, such as epoxy.

Figure 4:
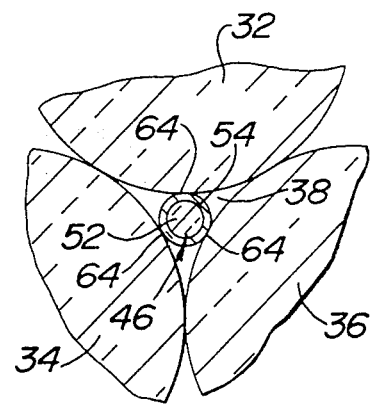
FIG. 4 is an enlarged sectional view taken along line 4—4 of FIG. 2.

As can be seen in FIG. 4, the optic fiber section 46 is of conventional construction and comprises a central fiber or core 52 of plastic or glass which is clad with a material 54, e.g., glass, having a lower refractive index than the core 52 to reduce light losses along the length thereof. The section of optic fiber 46 serves as the means for coupling light produced by the element 22 to the optic fiber 24. In this regard the fiber optic section 46 operates in a manner analagous to a prior art pigtail. The section 46 is secured to the light emitting diode 22 by placing the working face of the diode on the co-planar end surfaces 44 and 48 of the guide assembly and fiber optic sections 30 and 46, respectively, thereafter positioning the light emitting diode so that the portion of its face from which light is emitted is axially aligned with the fiber optic section 46 and securing the diode in place thereat, such as by means of epoxy.

The method of assembling the coupler 20 and light emitting diode 22 will be described in detail later.

In accordance with a preferred aspect of this invention, and as can be seen in FIG. 1, the guide assembly 20 is potted within a plastic type material (preferably transparent) to form a cylindrical housing 56. The housing serves to facilitate securement of the coupler to conventional fiber optic cables. The housing 56 includes a pair of ends 58 and 60, with end 58 being co-planar with end 42 of the guide assembly and with end 60 being co-planar with the co-planar portions 44 and 48 of the guide assembly and fiber optic section 46, respectively.

In order to connect the light emitting diode mounted on the coupler as described heretofore, the end 62 of the optical fiber 24 is prepared, e.g., cleaved flat, and is then inserted within mouth 40 of the guide assembly and down its channel into abutment with the flat prepared end 50 of the fiber optic section 46.

As noted heretofore, the guide element 30 is formed of glass. This feature is of considerable importance from a fabrication standpoint, and from a functional standpoint. In regard to the latter, glass is less susceptible to shrinkage, thereby ensuring dimensional ability for the guide. In addition, the glass provides a hard, yet smooth, interstitial surface which is abrasion and corrosion resistant. These features ensure that the optical fiber 24 will not be scored, scraped or otherwise damaged when inserted in the guide 30, nor will the guide be damaged, either of which occurrence would result in an unnecessary light loss due to damaged surfaces. Further, the transparency of the glass guide member enables the viewing of the positioning of the fiber ends therethrough and through the potting material 56, thereby facilitating the connection of the fibers.

The cusp-shape of the central channel 38 is also of significant importance in that when the optic fiber section 46 and the optic fiber 24 are inserted within the channel the only portions of the channel which engage the respective fibers are the three portions 64 (FIG. 4) formed by the innermost surface portions of the rod-like members 32, 34 and 36. The three point tangential contact of the guide member centers the optical fiber section 46 within the channel 38 and also facilitates the insertion of fiber 24 therein by enabling the fiber to be inserted with very little frictional engagement between it and the guide member. In addition, the fiber 24 is axially aligned with fiber section 46 by the three point contact.

The cusp-shaped interstices formed between the rod-like members also provide areas in which any detritus of the fiber can fall instead of being pushed along by the end of the fiber to the interface of the joint. Furthermore, if an index refraction matching fluid is used at the interface of ends 50 and 62 to reduce light loss, as is conventional, the presence of the cusp-shaped interstices permits the fluid to gain ingress thereto so as not to impede the approach of the fiber end 62 to end 50 as would be the case if the channel were circular or closely fitting the fiber.

The flared mouth 40 of the guide assembly facilitates the insertion of the optical fiber forming the section 46 into the channel to make the coupler 20, while also facilitating the insertion of the end of an optical fiber 24 into the completed coupler to connect the same into a fiber optic system.

Figure 5:
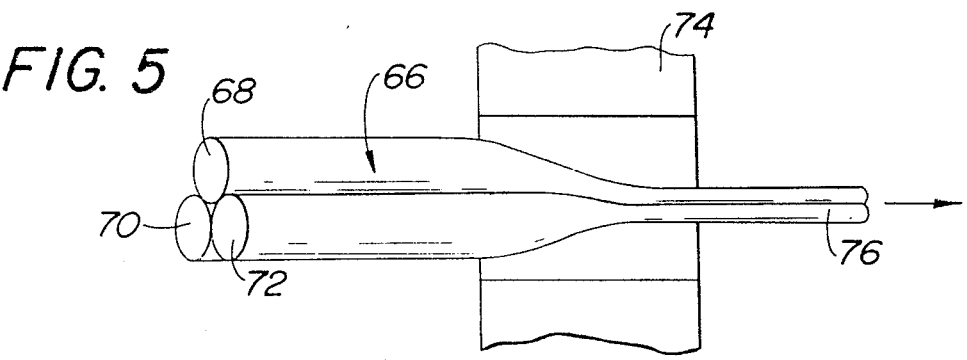
FIG. 5 is a perspective view showing an initial step in the formation of the coupler shown in FIG. 1.
Figure 6:
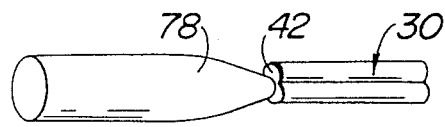
FIG. 6 is a perspective view of a subsequent step.
Figure 7:
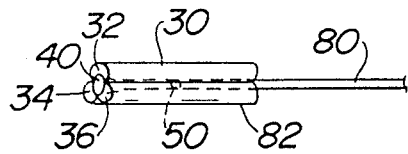
FIG. 7 is a perspective view of a still subsequent step.
Figure 8:
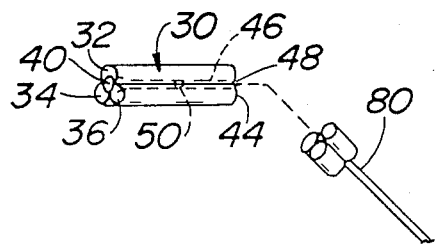
FIG. 8 is a perspective view of a still subsequent step.

The coupler 20 is constructed by utilizing an assemblage 66 of three identical glass rods 68, 70 and 72 (FIG. 5). The rods 68, 70 and 72 are disposed in a side-by-side parallel array to one another and with longitudinal peripheral portions of adjacent rods in contact and connected to each other. The assemblage 66 is then passed through a furnace 74 and means, not shown, (see FIG. 5) where it is drawn down in cross-sectional area such that the cusp-shaped channel formed between the rods fits the outside diameter of the optical fibers. The drawn assemblage is thereafter cut to a suitable length, e.g., 1 inch (2.54 centimeters) to form the guide member 30. As noted heretofore, the end 42 of the guide member 30 includes a flared mouth 40. The flared mouth is produced by inserting a tapered mandrel 78 into the channel 38 at the end 42 of the guide member while heating the same (see FIG. 6). A conventional optical fiber 80 is inserted into the mouth 40 of the guide 30 and is pulled therethrough until its free end 50, which had heretofore been squarely cleaved flat, is disposed at an intermediate point along the channel 38. The fiber is then secured in place at that position. The securement of the fiber is preferably accomplished by fusing it during a heating cycle. However, various other techniques can be used to secure the fiber in place, such as the use of an epoxy. Once the fiber 80 is secured in place as shown in FIG. 7, the periphery of a portion of the guide 30 is scribed at a location 82 forward of the end 50 of fiber 80. The guide 30 and assembled fiber 80 is thereafter cleaved along the scribed line 82 by bending the forwardmost portion of the guide 30, that is the portion forward of the scribed location 82, out of co-axial alignment with the remaining portion of the guide member. This action causes the rigid guide 30 to break or cleave along the scribe line to form a flat end 44 for the guide 30. In addition, the glass optical fiber secured within channel 38 is constrained to break at surface 48 which is flush with the end surface 44 of the guide 30. The freshly formed co-planar surfaces 44 and 48 are now suitable for disposition and securement to the working face of a light active element. In a preferred embodiment of this invention prior to such securement the guide assembly 30 is potted in a suitable transparent plastic material to form a cylindrical housing 56. The end walls 58 and 60 of the housing 56 are preferably co-planar with the respective ends 42 and 44 of the guide assembly 30.

After the guide assembly is potted a desired light active element, such as light emitting diode 22, is located on the end surface 44 of the guide. The element 22 is moved with respect to the fiber optic section 46 until its light emitting portion is axially aligned with end portion 48 of the fiber optic section. The alignment of the fiber optic section with the light emitting portion of the light emitting diode is accomplished using prior art techniques. However, in view of the fact that the coupler 20 is a rigid member the alignment process is greatly facilitated.

Once the positioning between the light emitting diode and the fiber optic section 46 has been established, the light emitting diode is epoxied in place. The assembled coupler and light emitting diode is now ready for use in a fiber optic transmission system by the insertion of the end 62 of the fiber optic 24 serving as the transmission line through the mouth 40 of the guide assembly 30 and into abutment with the end 50 of the optic fiber section 46.

In my co-pending U.S. patent Application Ser. No. 838,350, filed on Sept. 30, 1977, assigned to the same assignee as the instant invention and whose disclosure is incorporated by reference herein, there is disclosed a fiber optic connection guide formed of at least three predetermined length rods which are disposed in a side-by-side array parallel to one another with longitudinal peripheral portions of adjacent rods in contact with and connected to each other to form a cusp-shaped interstitial channel therebetween. The channel includes a pair of open ends and an arcuate portion between the ends. This arrangement ensures a superior fiber-to-fiber connection by creating a bias within the alignment body. This feature can be incorporated into the guide of the instant invention to create a superior fiber-to-fused fiber contact.

It should be appreciated from the foregoing that the instant invention offers many advantages over the prior art. For example, the coupler can be made accurately, yet inexpensively, using existing glass-working and molding techniques. In addition, the coupler facilitates very accurate fiber-to-light active device registration. Furthermore, the coupler with its permanently connected light active element is suitable for either temporary or permanent attachment into a fiber optic transmission line. Further still, the coupler of the instant invention is compatible with in-line, fiber-to-fiber connections, like that disclosed in my two aforenoted co-pending patent applications. Further yet, the construction of the coupler renders it particularly suitable for the utilization of an index matching fluid or epoxy at the fiber-to-fiber interface within the coupler.

It should be pointed out at this juncture that while the embodiment of this invention, as shown in the drawings herein includes a guide having three rod-like members, it is clear that the guide 30 can be modified to accommodate more than one fiber by increasing the number of rods and corresponding number of interstitial channels for fiber alignment and inclusion.

Without further elaboration, the foregoing will so fully illustrate my invention that others may, by applying current or future knowledge, readily adapt the same for use under various conditions of service.

I claim:

1. An optical fiber coupler for interfacing with a light active element, said coupler comprising a guide assembly having at least three glass elongated members having cylindrical surface portions, said members being disposed in a side-by-side array parallel to one another with longitudinal peripheral surface portions of adjacent members in contact and connected to each other to form a cusp-shaped interstitial channel therebetween; said assembly including a flat first end, an optical fiber having a first and second flat end disposed within said channel and secured in place therein, with said fiber second end being located at an intermediate portion along said channel, with said fiber first end being co-planar with the flat first end of said guide assembly, said light active element being mounted directly on and secured to the first end of the guide assembly and being aligned with the first end of said optical fiber to form a good light transmissive interface; said interstitial channel having an open end oppositely disposed to said light-active element for reception of optical fiber ends adapted to engage said optical fiber flat second end disposed in said channel intermediate portion for purposes of effecting good light transmissive connections therewith.

2. The optical fiber coupler of claim 1 wherein each of said elongated members is a rod.

3. The optical fiber coupler of claim 1 wherein the open end of said interstitial channel is flared to facilitate ingress of an optical fiber into such channel.

4. The optical fiber coupler of claim 3 wherein said optical fiber secured within said channel is fused in place.

5. The optical fiber coupler of claim 4 wherein said guide assembly is potted within a cylindrical housing.

6. A method of securing an optical fiber to a light active element comprising the steps of forming a guide assembly of at least three glass elongated members having cylindrical surface portions disposed in a side-by-side array parallel to one another with longitudinal peripheral surface portions of adjacent members in contact and connected to each other and forming a cusp-shaped interstitial channel therebetween, inserting an optical fiber having a flat prepared end within said channel and with said end being located at an intermediate point therealong for securing said fiber in place, scribing said guide and thereafter bending said guide at the scribed point to cause said guide to cleave to form a flat end for said guide and a co-planar flat and for said fiber and thereafter directly mounting and securing a light active element onto said flat end of the guide and aligned with said fiber at said flat end.

7. The method of claim 6 wherein one end of the channel is flared.

8. The method of claim 7 wherein the flaring of said channel at said one end is accomplished prior to the insertion of said fiber within said channel.

9. The method of claim 8 wherein prior to the securement of the light active element to said guide member, said guide member is potted within a plastic material.

* * * * *

UNITED STATES PATENT AND TRADEMARK OFFICE
CERTIFICATE OF CORRECTION

PATENT NO. : 4,201,443
DATED : May 6, 1980
INVENTOR(S) : Malcolm H. Hodge

It is certified that error appears in the above-identified patent and that said Letters Patent are hereby corrected as shown below:

Column 2, line 18, change "therein" to -- thereon --

Column 2, line 27, change "accomplished" to -- complicated --

Column 3, line 11, "foat" should be -- flat --

Column 4, line 61, change "ability" to -- stability --

Claim 6, column 8, line 24, change "and" (second occurrence) to -- end --

Signed and Sealed this

Twenty-third Day of September 1980

[SEAL]

Attest:

SIDNEY A. DIAMOND

*Attesting Officer*  *Commissioner of Patents and Trademark*